(12) United States Patent
Howard

(10) Patent No.: US 9,227,280 B2
(45) Date of Patent: Jan. 5, 2016

(54) SPHERICAL BEARING RETENTION CLIP

(71) Applicant: The Boeing Company, Chicago, IL (US)

(72) Inventor: Jesse P. Howard, Arlington, WA (US)

(73) Assignee: The Boeing Company, Chicago, IL (US)

( * ) Notice: Subject to any disclaimer, the term of this patent is extended or adjusted under 35 U.S.C. 154(b) by 285 days.

(21) Appl. No.: 13/886,926

(22) Filed: May 3, 2013

(65) Prior Publication Data

US 2014/0325845 A1    Nov. 6, 2014

(51) Int. Cl.
| | |
|---|---|
| *F16B 21/07* | (2006.01) |
| *B23P 15/00* | (2006.01) |
| *F16C 11/04* | (2006.01) |
| *F16C 11/06* | (2006.01) |
| *F16C 17/02* | (2006.01) |
| *F16C 17/24* | (2006.01) |

(52) U.S. Cl.
CPC ............ *B23P 15/003* (2013.01); *F16C 11/045* (2013.01); *F16C 11/0614* (2013.01); *F16C 17/02* (2013.01); *F16C 17/24* (2013.01); *F16B 21/071* (2013.01); *Y10T 29/49643* (2015.01); *Y10T 29/53* (2015.01)

(58) Field of Classification Search
CPC . Y10T 29/53; Y10T 29/49643; B23P 15/003; F16B 21/071; F16B 9/023; F16C 11/045; F16C 11/0614; F16C 17/02; F16C 17/24
See application file for complete search history.

(56) References Cited

U.S. PATENT DOCUMENTS

| | | |
|---|---|---|
| 4,428,688 A | 1/1984 | McGregor, Jr. |
| 5,501,421 A | 3/1996 | Klueting |
| 6,376,789 B2 * | 4/2002 | Maruyama et al. ........... 200/344 |
| 2012/0251224 A1 | 10/2012 | Halcom et al. |

FOREIGN PATENT DOCUMENTS

WO    2008100246 A2    8/2008

* cited by examiner

*Primary Examiner* — Richard Chang
(74) *Attorney, Agent, or Firm* — Felix L. Fischer

(57) ABSTRACT

An apparatus for aligning an inner collar associated with a bearing incorporates a base member with a first member extending substantially perpendicular from the base member and a second member also extending substantially perpendicular from the base member, substantially parallel with said first member with a defined distance between the first and second member. The first member and the second member form opposing sides defined by a semi-circular contour formed therein such that the first member and the second member are operable to engage an inner collar of a bearing in a snap-fit engagement on opposite sides of the bearing such that the inner collar is maintained in a substantially orthogonal orientation with respect to walls of a structure in which the bearing has been mounted.

18 Claims, 15 Drawing Sheets

SPHERICAL BEARING RETENTION CLIP

BACKGROUND INFORMATION

1. Field

Embodiments of the disclosure relate generally to the field of assembly tools for mating parts joined with spherical bearings and more particularly to a clip engaging cylindrical extensions of a spherical bearing and surfaces of a structural tang for orthogonal centering of the bearing in the tang to closely receive a clevis over the tang and bearing.

2. Background

Spherical bearings are employed in numerous structural joints for various mechanical systems including control surface attachments for aircraft. The spherical bearing provides multi-axis freedom of movement between joined parts to avoid binding during operation. Forces between the structural members are limited to tension and shear with elimination of bending or buckling forces. The issue with the spherical bearing design is that when the inner portion of the bearing gets cocked relative to the part in which it has been installed, the effective length increases. With close tolerances required for adequate "as installed" operation, this length increase prevents the parts from mating during assembly.

It is therefore desirable to provide a tool for orthogonal alignment of spherical bearings during assembly.

SUMMARY

Embodiments disclosed herein provide an apparatus for aligning an inner collar associated with a bearing. The apparatus incorporates a base member with a first member extending substantially perpendicular from the base member and a second member also extending substantially perpendicular from the base member, substantially parallel with said first member with a defined distance between the first and second member. The first member and the second member form opposing sides defined by a semi-circular contour formed therein such that the first member and the second member are operable to engage an inner collar of a bearing in a snap-fit engagement on opposite sides of the bearing such that the inner collar is maintained in a substantially orthogonal orientation with respect to walls of a structure in which the bearing has been mounted.

The embodiments provide a method for aligning an inner collar of a bearing wherein an assembly component including a spherical bearing is selected. The assembly component is engaged with a retention clip having parallel side plates spaced to receive the assembly component and having cutouts to receive a protruding inner collar of the spherical bearing. The inner collar is resiliently engaged within the cutouts and maintained orthogonal to surfaces of the tang.

A method for fabricating the embodiments is accomplished by forming a base with upstanding parallel side plates sized to receive an assembly component. Cutouts are inserted in the side plates with semi-circular portions to receive an inner collar of a spherical bearing in the assembly component.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide a clip to restrain movement of spherical bearings and aid in assembly of close tolerance structures or components. The clip is of plastic construction. The clip is made to specific sizes of bearings and inner collar protrusions. A "snap" fit design allows for easy removal after assembly.

Figure 1A:
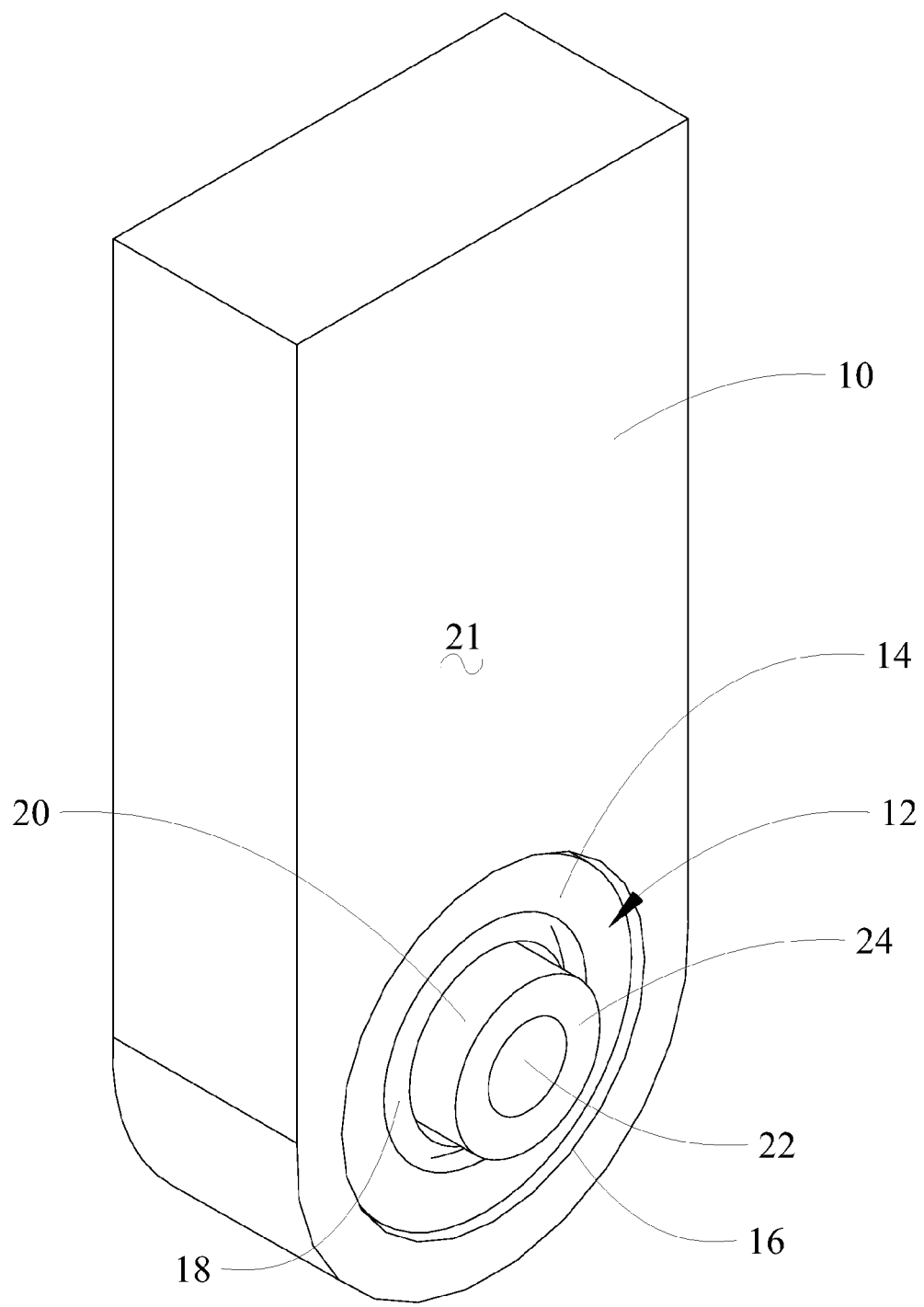
FIG. 1A is an external isometric view of a structural tang with a spherical bearing inserted for which embodiments as described herein may be employed.
Figure 1B:
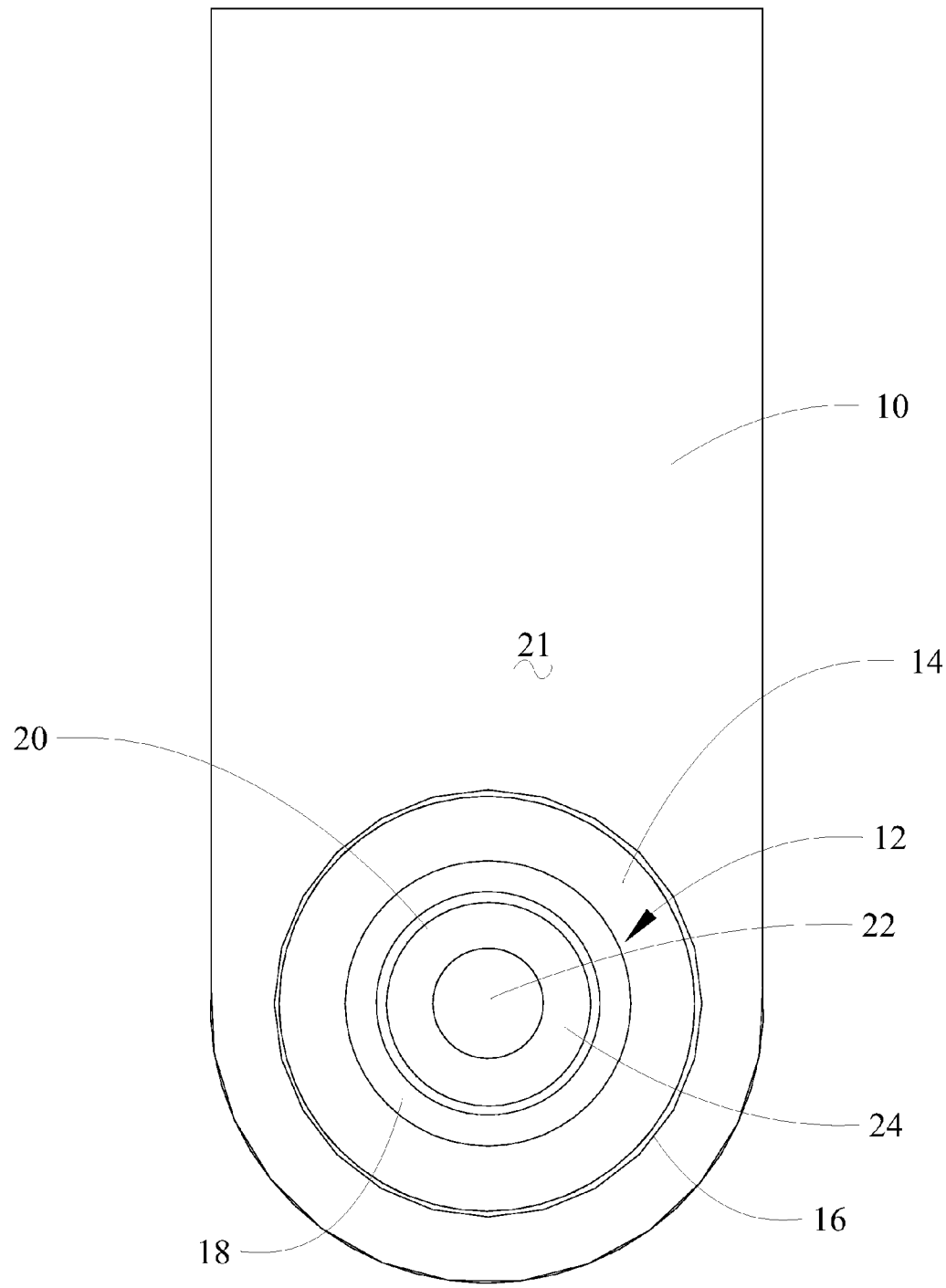
FIG. 1B is a side view of the structural tang of FIG. 1A.
Figure 1C:
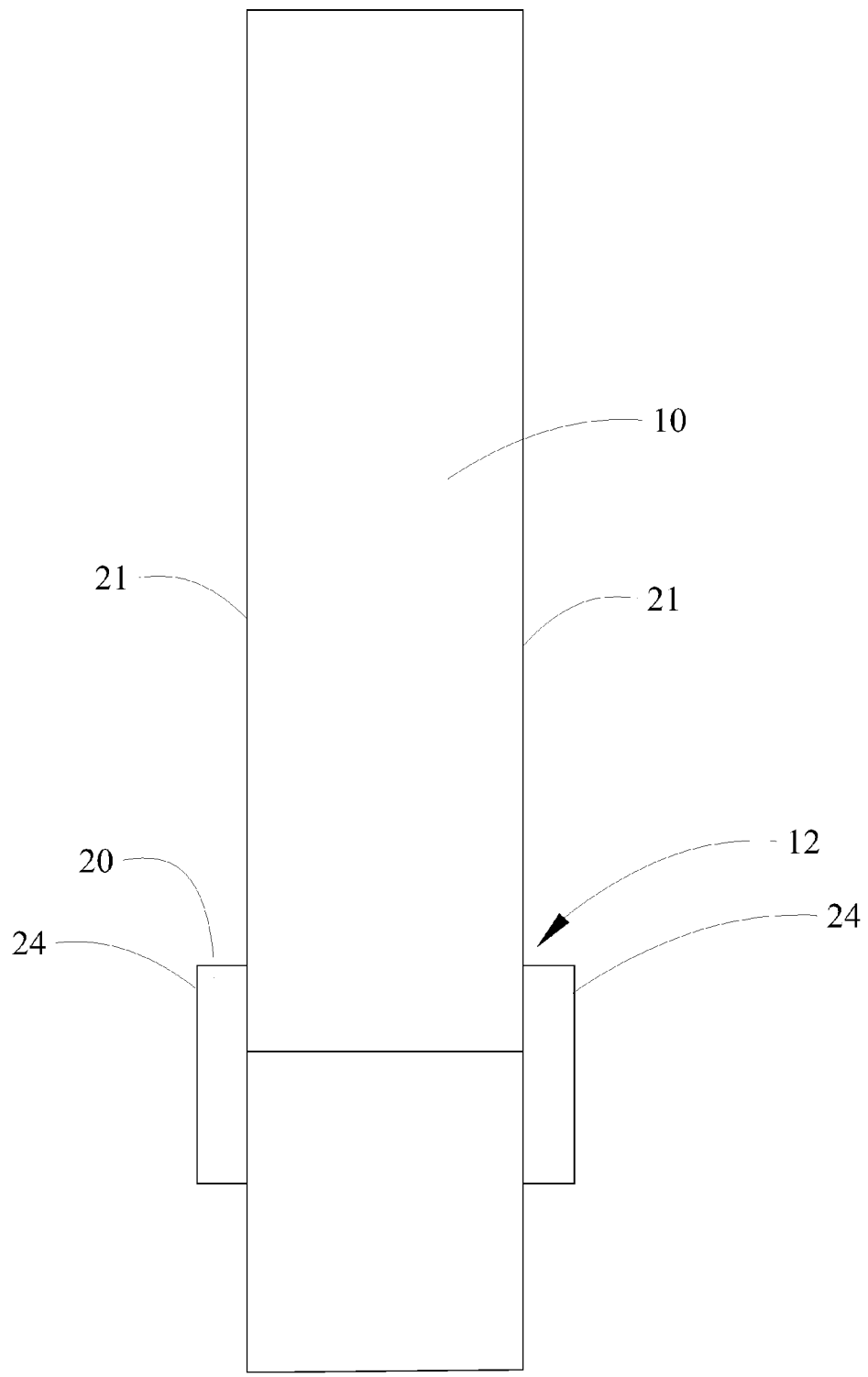
FIG. 1C is a front view of the structural tang.

Referring to the drawings, FIGS. 1A-1C show a first structural element, tang 10, in which a spherical bearing 12 is installed. The spherical bearing 12 has a retention ring 14 received within a bore 16 in the structural tang. The spherical element 18 of the bearing is restrained in the retention ring 14 and a cylindrical inner collar 20 protrudes from the spherical element. The inner collar extends beyond the plane of side surfaces 21 of the structural tang as best seen in FIG. 1C. A bore 22 extending through the spherical bearing receives a retaining pin or bolt as will be described subsequently. An engagement surface 24 is present on the inner collar to engage the mating component.

Figure 2A:
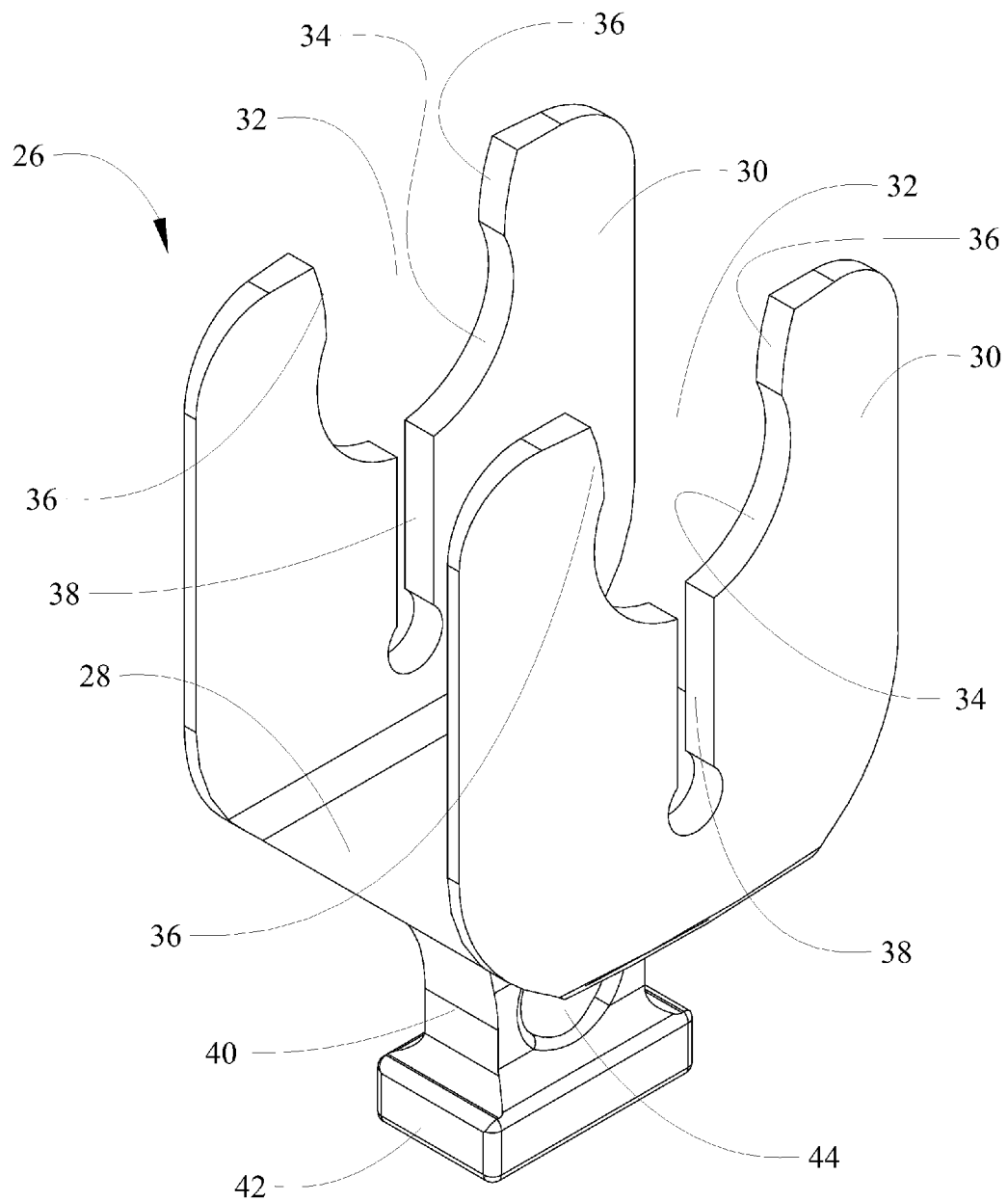
FIG. 2A is an isometric view of an exemplary embodiment of a retention clip.
Figure 2B:
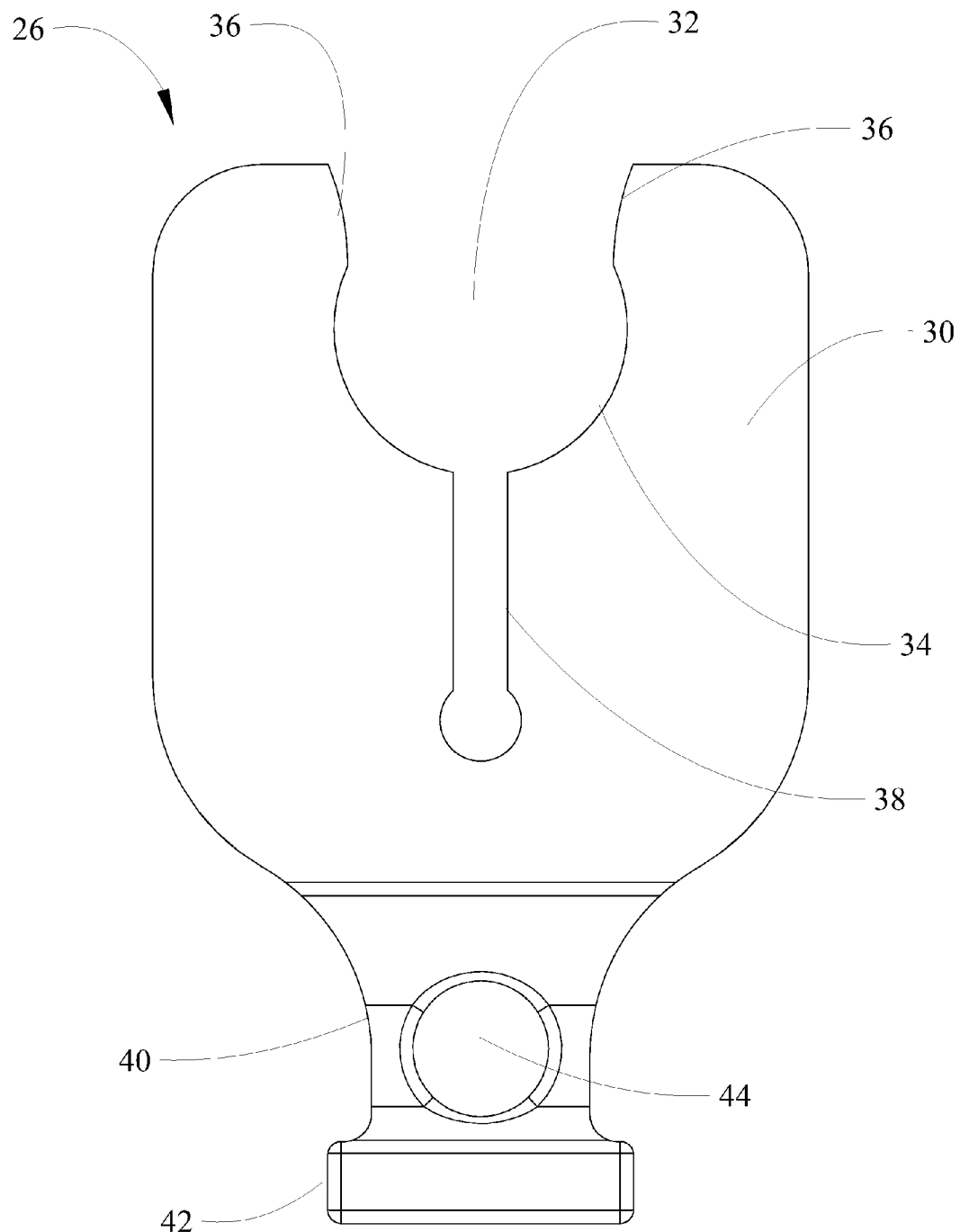
FIG. 2B is a side view of the retention clip shown in FIG. 2A.
Figure 2C:
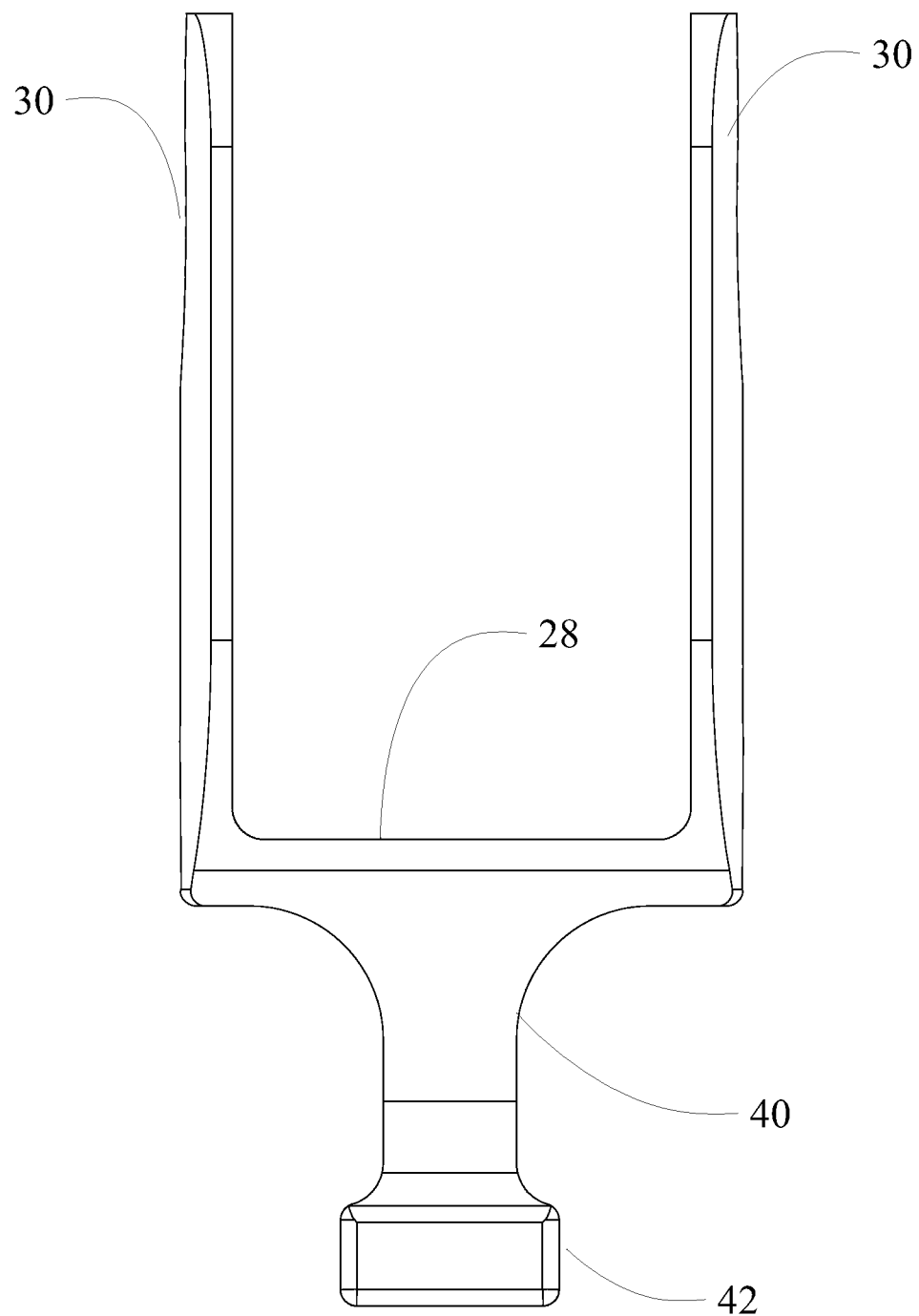
FIG. 2C is a front view of the retention clip.
Figure 2D:
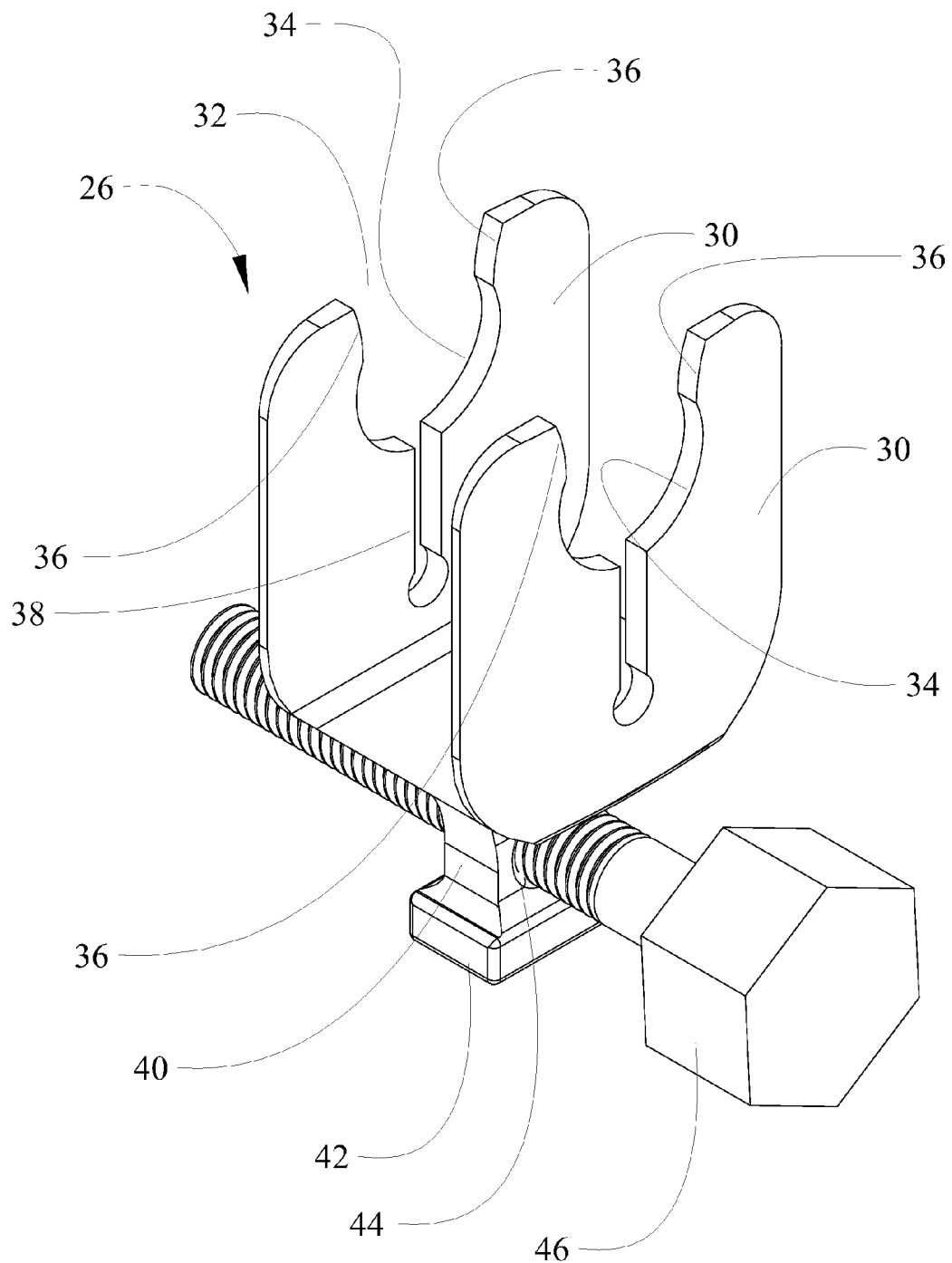
FIG. 2D is an isometric view of the retention clip with a bolt inserted in the retaining hole.

An exemplary embodiment of a retention clip 26 is shown in FIGS. 2A-2C. A base 28 supports two upstanding members, for the embodiment shown side plates 30, substantially perpendicular to the base and parallel to one another. The side plates are spaced to closely receive the tang between them and engage the side surfaces. Each side plate incorporates a shaped cutout 32 having a portion with a semi-circular contour 34 sized to engage the protruding ends of an inner collar 20 of the spherical bearing 12. The semi-circular contours 34 of the cutouts 32 terminate in ears 36 sized to resiliently constrain the inner collar once inserted into the cutouts. For the embodiment shown a relief slot 38 extends from each cutout to enhance resiliency of the side plates 30 for insertion of the inner collar 20 into the cutouts 32 as will be described with respect to FIGS. 3A-3C. For embodiments of certain sizes and/or materials the side plates may be sufficiently resilient to allow elimination of the relief slots. A handle 40 extends from the base 28 opposite from the side plates 30. For the embodiment shown, the handle includes an end flange 42 to assist in providing a positive grip on the handle and an aperture 44 in which a retaining pin or bolt 46 to be used in assembly of the mating parts may be temporarily inserted as shown in FIG. 2D. For example embodiments, the retention clip is injection molded from ABS plastic.

Figure 3A:
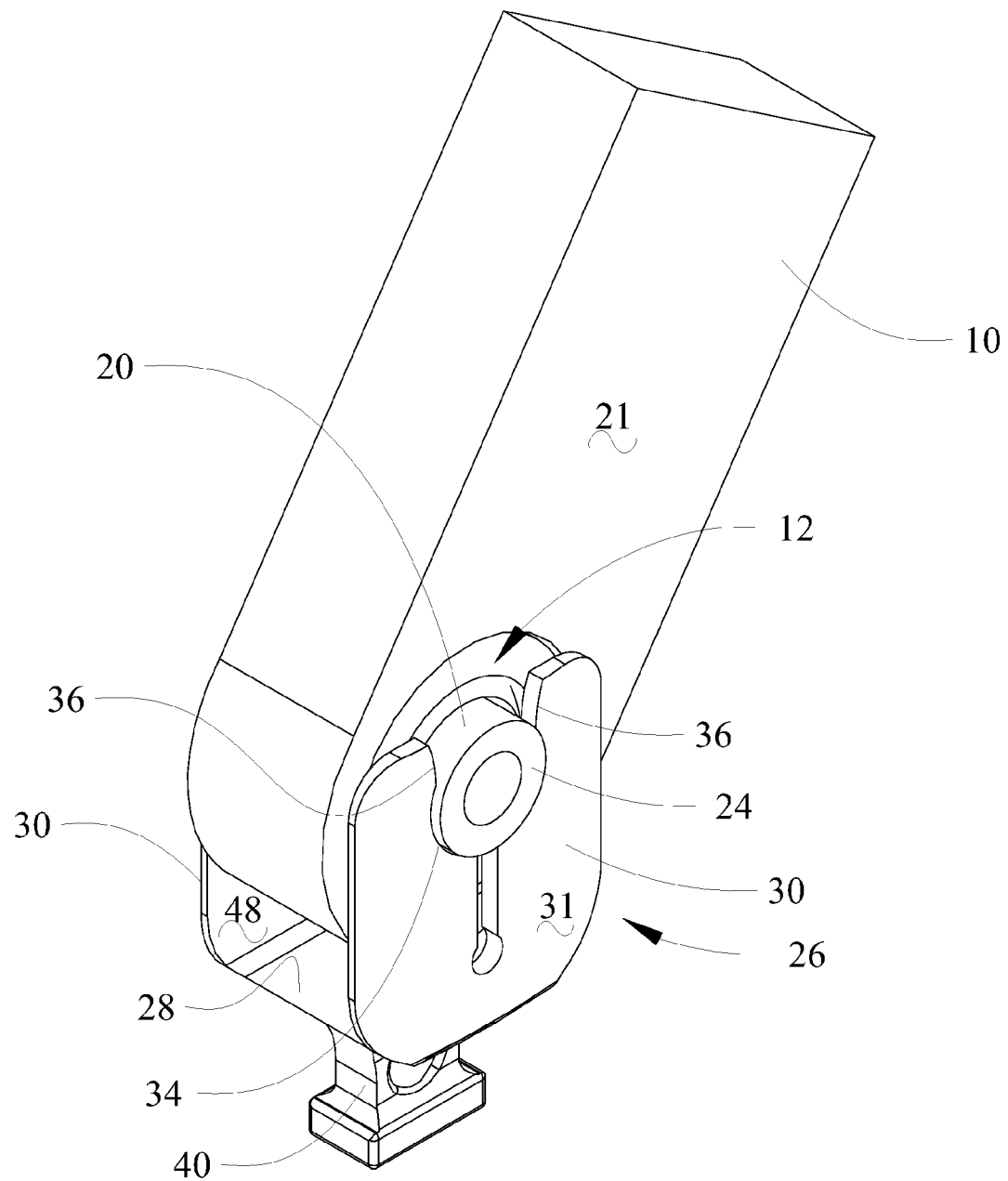
FIG. 3A is a detailed isometric view of the retention clip inserted on the structural tang for orthogonal alignment of the spherical bearing.
Figure 3B:
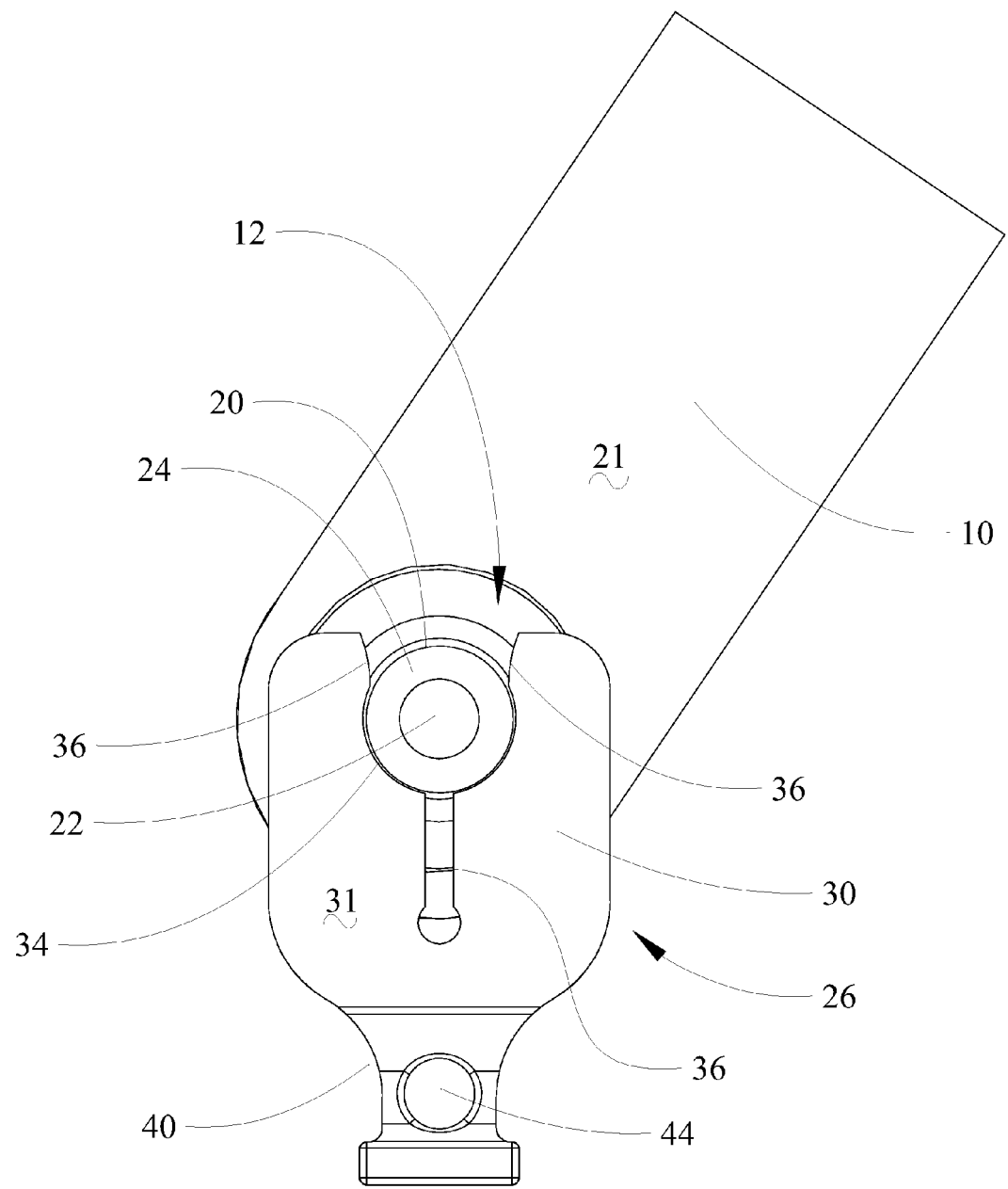
FIG. 3B is a side view of the retention clip inserted on the structural tang for orthogonal alignment of the spherical bearing.
Figure 3C:
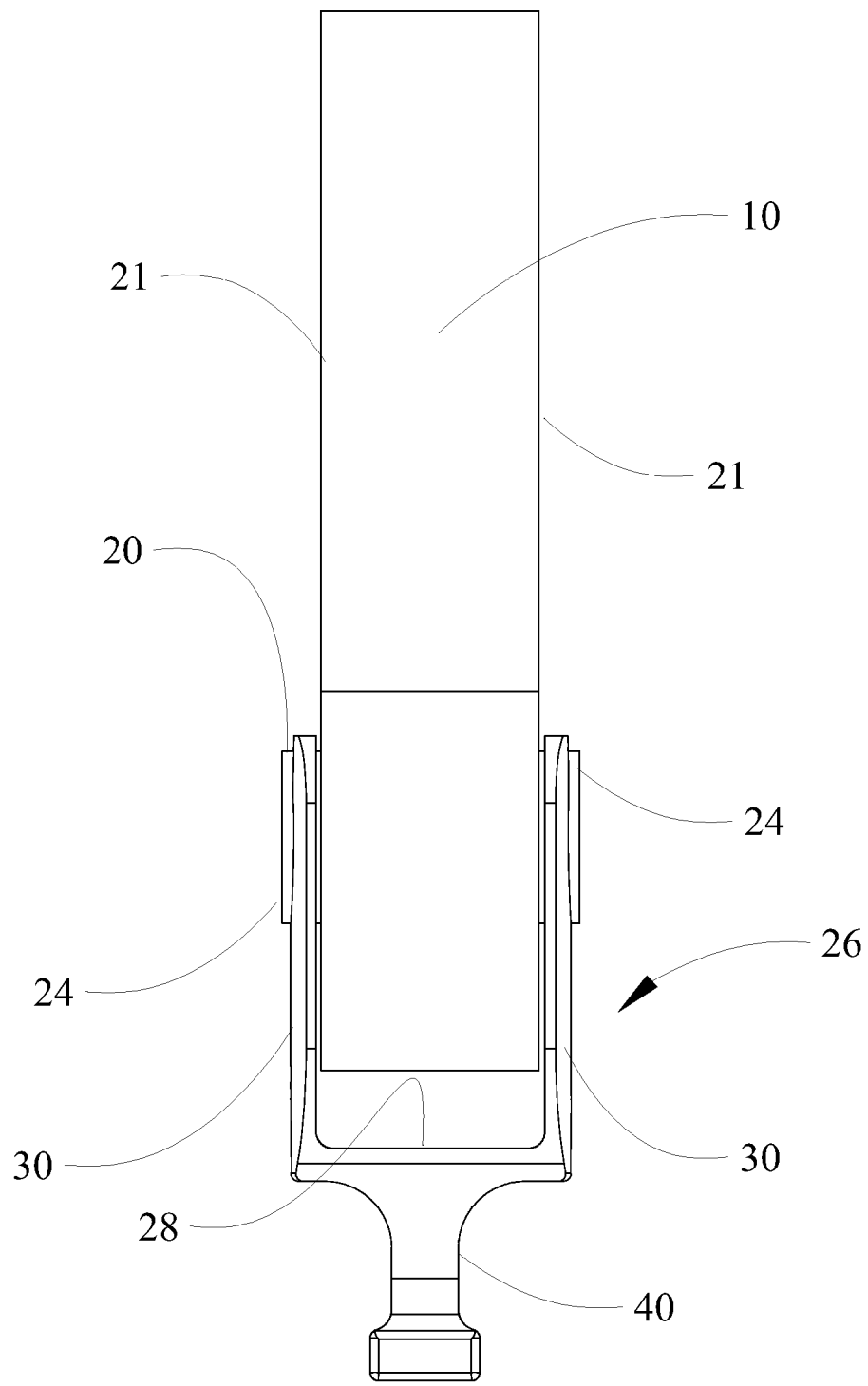
FIG. 3C is a front view of the retention clip inserted on the structural tang for orthogonal alignment of the spherical bearing.

As shown in FIGS. 3A-3C, the retention clip 26 is engaged to the structural tang 10 with inner surfaces 48 of the side plates 30 closely receiving the side surfaces 21 of the tang. The ears 36 of the cutouts in the side plates 30 resiliently part to allow insertion of the inner collar 20 into the semi-circular contours 34 of the cutouts and then rebound to retain the inner collar within the retention clip. The side plates restrain the inner collar 20 in an orthogonal position relative to the surfaces 21 of the tang 10 assuring that engagement surfaces 24 on the inner collar are parallel to the surfaces of the tang avoiding any cocking that might extend the effective length of the bearing.

Figure 4:
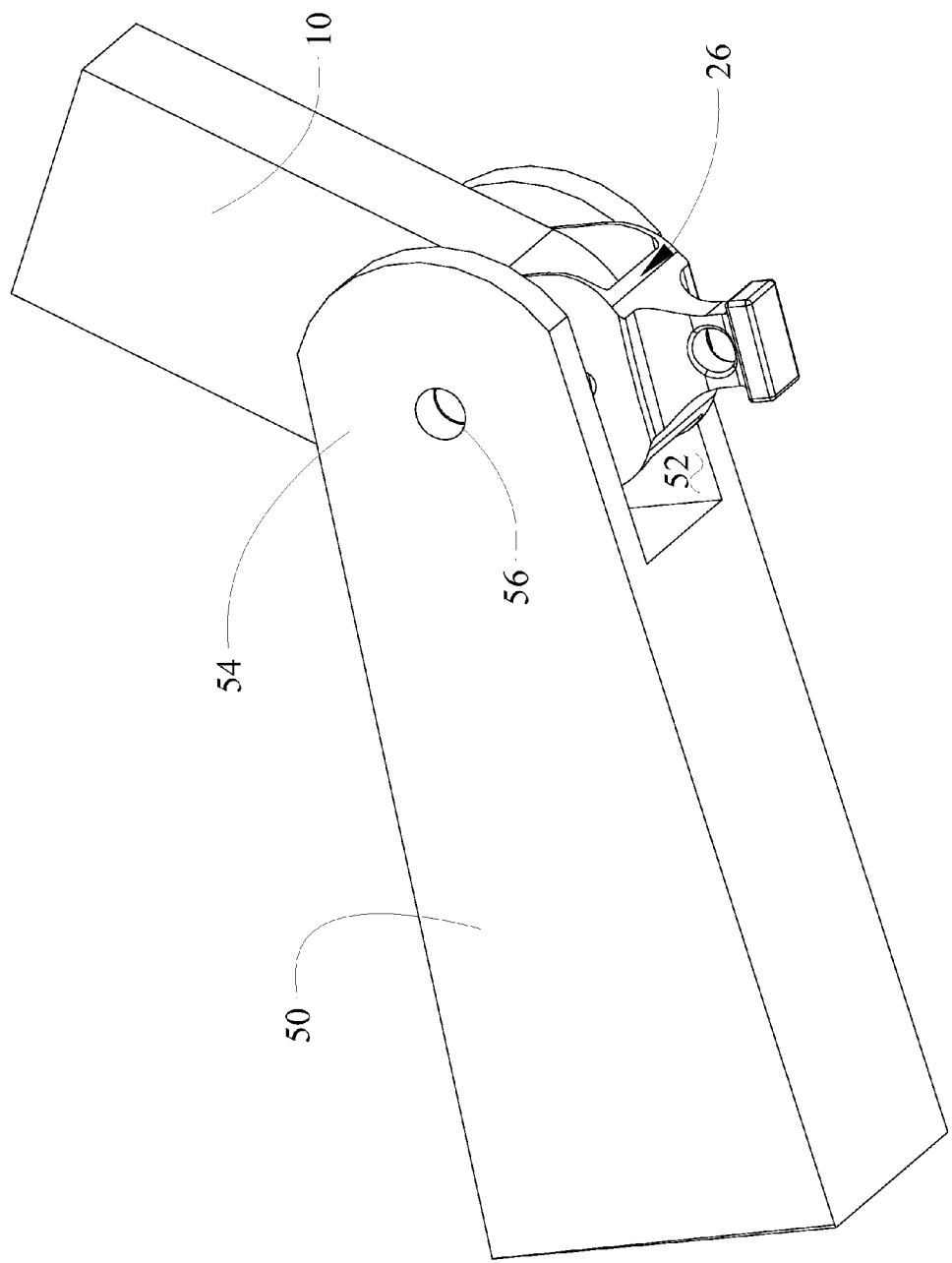
FIG. 4 is a pictorial view of a clevis assembled onto the structural tang with the retention clip in place.

As shown in FIG. 4, the mating structural element, for the embodiment shown a clevis 50, receives the tang 10 including the spherical bearing 12 with the retention clip 26 installed. Inner surfaces 52 of the clevis arms 54 closely receive the engagement surfaces 24 of the inner collar 20 in the spherical bearing 12 with holes 56 aligned with the bore 22 in the spherical bearing. Thickness of the side plates 30 in the retention clip is less than the protruding dimension of the inner collar (as best seen in FIG. 3C) thereby allowing the assembly of the clevis and tang with the retention clip in place. Additionally, the outer surfaces 31 of the side plates 30 (best seen in FIGS. 3A and 3B) may be convex in shape to enhance the reception of the clevis over the retainer clip 26, inner collar 20 and tang 10.

Figure 5:
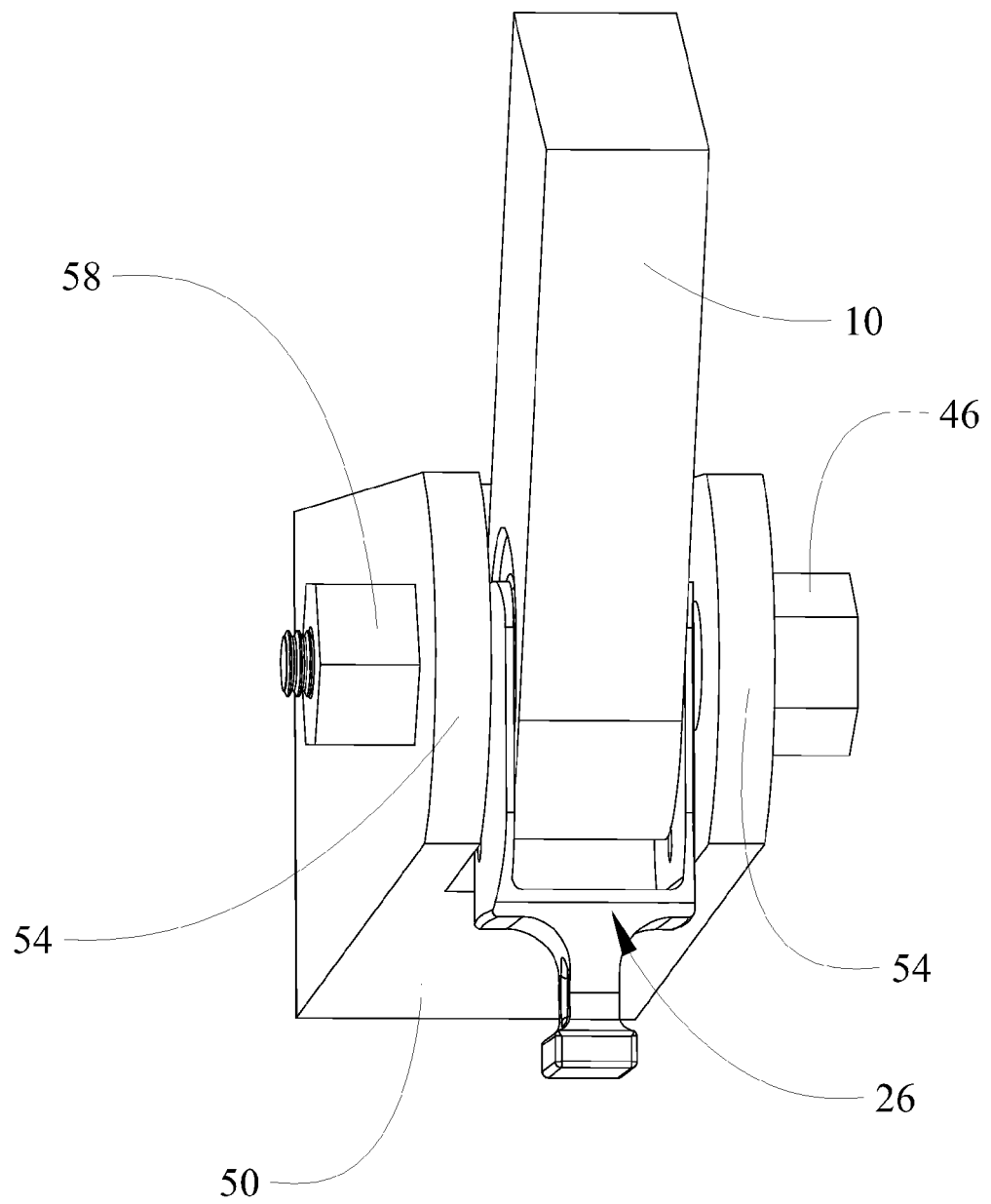
FIG. 5 is a pictorial view of the clevis assembled onto the structural tang with the retention clip in place with the associated bolt and nut inserted to restrain the clevis and tang assembly.
Figure 6:
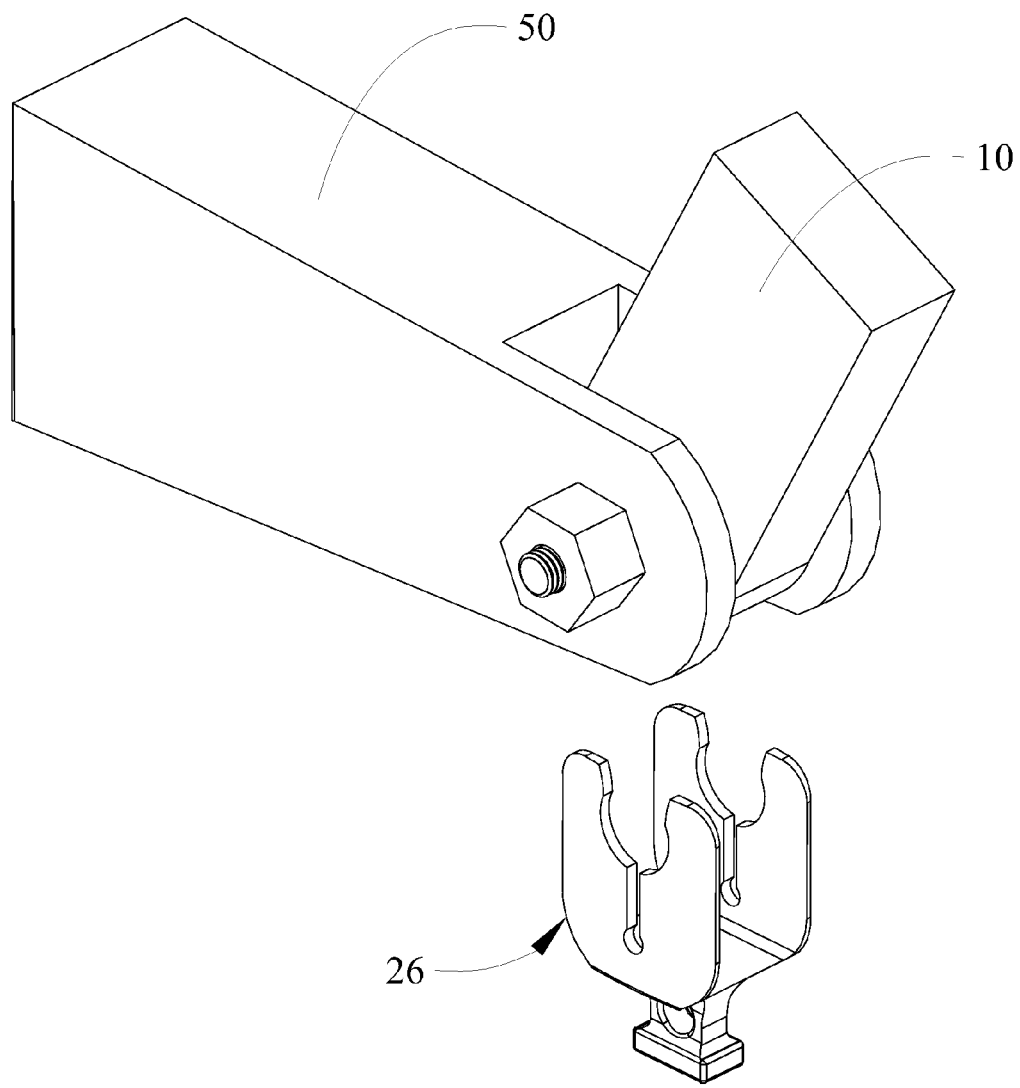
FIG. 6 is a pictorial view of the clevis and tang assembly with the retention clip disengaged.

The bolt 46 may then be inserted through the holes 56 in the clevis arms and bore 22 in the spherical bearing and a nut 58 installed to complete the assembly as shown in FIG. 5. Temporary placement of the bolt 46 in the hole 44 of the retention clip 26, as shown in FIG. 2D, prior to assembly and then removal of the bolt for insertion into the assembled structure provides excellent visual confirmation of the partial and then completed assembly. The retention clip 26 may then be removed as shown in FIG. 6 leaving the completed assembly of the tang 10 and clevis 50.

Figure 7:
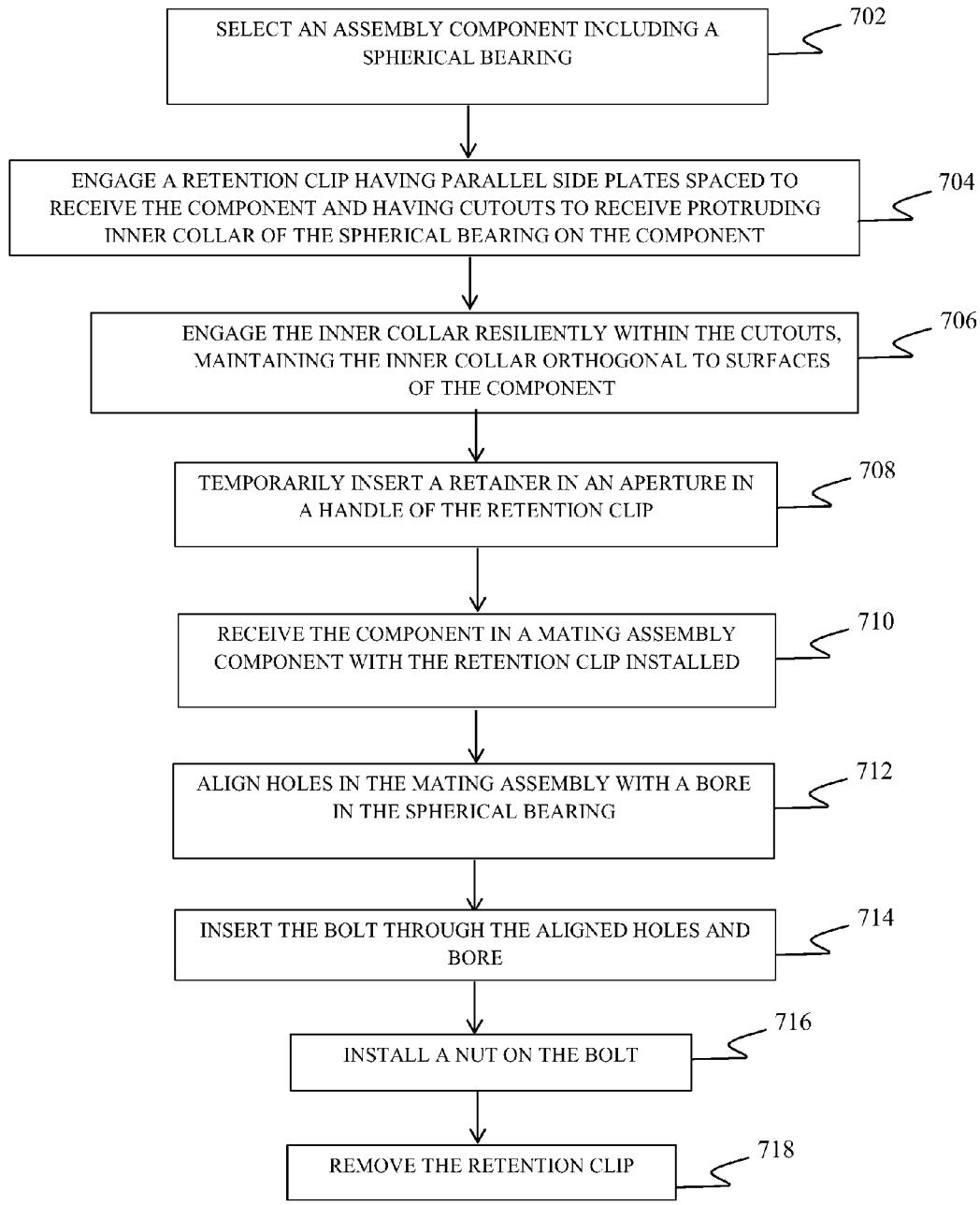
FIG. 7 is a flow chart of the method for assembling a mating assembly with a spherical bearing using the disclosed embodiments; and, FIG. 8 is a flow chart of a method for fabrication of a retention clip.

The retention clip embodiments disclosed herein provide a method for assembly of components incorporating a spherical bearing as shown in FIG. 7. An assembly component such as a structural tang including a spherical bearing is selected, step 702. A retention clip having parallel side plates spaced to receive the tang and having cutouts to receive protruding inner collar of the spherical bearing is engaged on the tang, step 704, and the inner collar resiliently engaged within the cutouts, step 706, maintaining the inner collar orthogonal to surfaces of the tang. A retainer such as a bolt is temporarily inserted in an aperture in a handle of the retention clip, step 708. A mating assembly component such as a clevis receives the tang with the retention clip installed, step 710. Holes in the clevis are aligned with a bore in the spherical bearing, step 712, and the bolt is inserted through the aligned holes and bore, step 714. A nut is then installed on the bolt, step 716. The retention clip is then removed, step 718.

Figure 8:
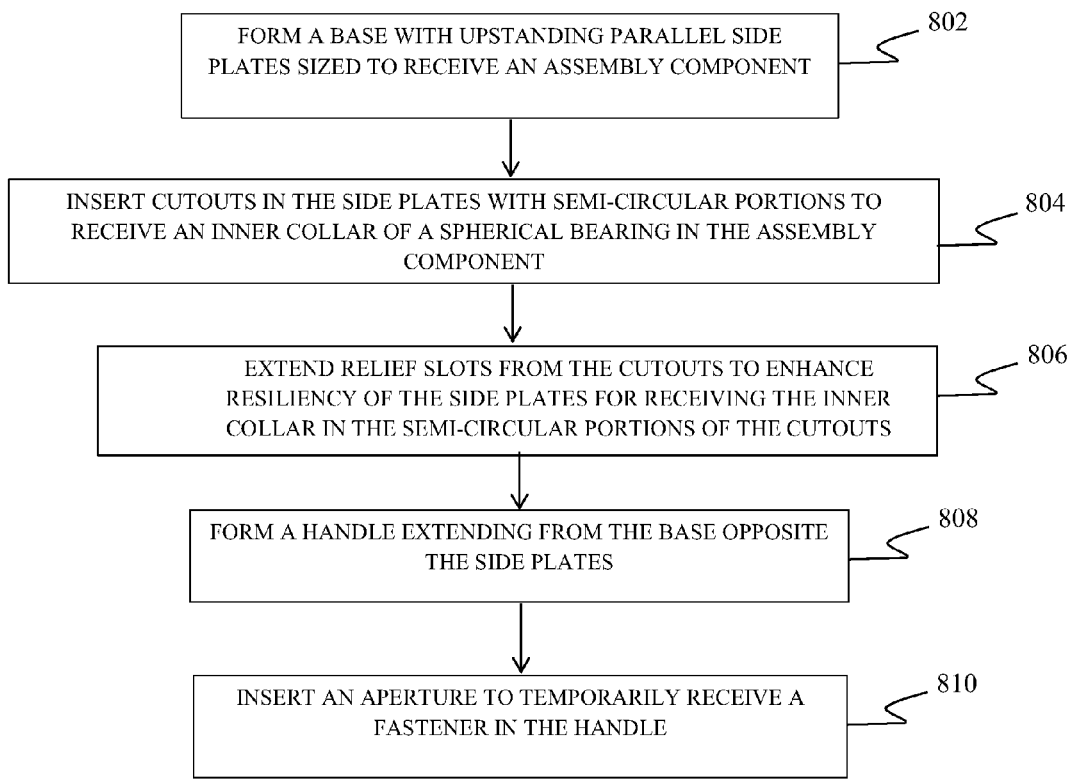

Fabrication of a retention clip according to the embodiments disclosed herein may be accomplished as shown in FIG. 8. A base is formed with upstanding parallel side plates sized to receive an assembly component, step 802. Cutouts are inserted in the side plates with semi-circular portions to receive an inner collar of a spherical bearing in the assembly component, step 804. Relief slots are extended from the cutouts to enhance resiliency of the side plates for receiving the inner collar in the semi-circular portions of the cutouts, step 806. A handle is formed extending from the base opposite the side plates, step 808. An aperture to temporarily receive a fastener is inserted in the handle, step 810. The described steps may be performed individually by assembly and machining or in concert by injection molding or similar processes and are not limited by the order in which presented. The embodiments disclosed are particularly adaptable to three dimensional (3D) printing or Fused Deposition Modeling (FDM) fabrication applications allowing rapid production of various sizes for use with a broad range of structural components employing spherical bearings.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An apparatus for aligning an inner collar associated with a bearing, said apparatus comprising:
   a base member;
   a first member extending substantially perpendicular from said base member;
   a second member extending substantially perpendicular from said base member and substantially parallel with said first member, said first member and said second member providing opposing sides closely receiving a tang therebetween, said tang having a bearing with a rotatable inner collar inserted in a bore in the tang and extending beyond side surfaces of the tang, said first and second member defined by a semi-circular contour formed therein to removeably engage the inner collar of the bearing in a snap-fit engagement on opposite sides of the tang thereby maintaining the inner collar in a substantially orthogonal orientation with respect to walls of a mating structure received over the bearing, tang and first and second member.

2. The apparatus as defined in claim 1 wherein the semi-circular contours are incorporated in cutouts in the first and second members, said cutouts terminating in ears resiliently deformable to accept the inner collar.

3. The apparatus as defined in claim 2 further comprising relief slots extending from the cutouts for added resiliency in the first and second members during deformation to accept the inner collar.

4. The apparatus as defined in claim 1 further comprising a handle extending from the base member opposite the first and second members.

5. The apparatus as defined in claim 4 wherein the handle incorporates an aperture to temporarily receive a fastener.

6. The apparatus as defined in claim 1 wherein the first member and second member have a thickness less than a protruding extent of the inner collar whereby the mating structure is received over the first and second member for engagement of the inner collar.

7. An apparatus for aligning an inner collar associated with a bearing, said apparatus comprising:
   a base member;
   a first member extending substantially perpendicular from said base member;
   a second member extending substantially perpendicular from said base member and substantially parallel with said first member, a defined distance therebetween, said first member and said second member each comprising opposing sides defined by a semi-circular contour formed therein such that said first member and said second member are operable to engage an inner collar of a bearing in a snap-fit engagement on opposite sides of the bearing such that the inner collar is maintained in a substantially orthogonal orientation with respect to walls of a structure in which the bearing has been mounted;

a handle extending from the base opposite the first and second members wherein the handle terminates in an end flange.

8. The apparatus as defined in claim 7 wherein the semi-circular contours are incorporated in cutouts in the first and second members, said cutouts terminating in ears resiliently deformable to accept the inner collar.

9. The apparatus as defined in claim 7 further comprising relief slots extending from the cutouts for added resiliency in the first and second members during deformation to accept the inner collar.

10. The apparatus as defined in claim 7 wherein the handle incorporates an aperture to temporarily receive a fastener.

11. The apparatus as defined in claim 7 wherein the first member and second member have a thickness less than a protruding extent of the inner collar whereby a mating structure is received over the first and second member for engagement of the inner collar.

12. A method for aligning an inner collar of a bearing comprising:
   selecting an assembly component having flat sides and including a spherical bearing in a bore;
   engaging the assembly component with a retention clip having parallel side plates spaced to be closely received over the sides of the assembly component and having cutouts to receive a protruding inner collar of the spherical bearing;
   engaging said inner collar resiliently within the cutouts; and,
   maintaining the inner collar orthogonal to surfaces of the sides of the assembly component and,
   removing the retention clip.

13. The method of claim 12 further comprising:
   inserting a retainer temporarily in an aperture in a handle of the retention clip.

14. The method of claim 12 further comprising:
   receiving the assembly component in a mating assembly component with the retention clip installed;
   aligning holes in the mating assembly component with a bore in the spherical bearing;
   and inserting a bolt through the aligned holes and bore; and,
   installing a nut on the bolt.

15. A method for fabrication of a bearing inner collar alignment clip comprising:
   forming a base with upstanding parallel side plates sized to receive side surfaces of an assembly component; and,
   inserting cutouts in the side plates with semi-circular portions to receive an inner collar of a spherical bearing mounted in a bore in the assembly component, wherein said inner collar extends beyond the side surfaces.

16. The method of claim 15 further comprising:
   extending relief slots from the cutouts to enhance resiliency of the side plates for receiving the inner collar in the semi-circular portions of the cutouts.

17. The method of claim 15 further comprising:
   forming a handle extending from the base opposite the side plated.

18. The method of claim 17 further comprising:
   inserting an aperture in the handle to temporarily receive a fastener.

* * * * *